(No Model.)

L. SCOFIELD.
Mechanical Movement.

No. 230,349. Patented July 20, 1880.

Witnesses:

Inventor:

United States Patent Office.

LEVI SCOFIELD, OF GRAND HAVEN, MICHIGAN.

MECHANICAL MOVEMENT.

SPECIFICATION forming part of Letters Patent No. 230,349, dated July 20, 1880.

Application filed June 11, 1880. (No model.)

*To all whom it may concern:*

Be it known that I, LEVI SCOFIELD, of Grand Haven, in the county of Ottawa and State of Michigan, have invented a new and useful Mechanical Movement; and I do hereby declare the following to be a full, clear, concise, and exact description thereof, which will enable others skilled in the art to which it relates to make and use it, reference being had to the accompanying drawings, forming part of this specification, wherein—

Figure 1:
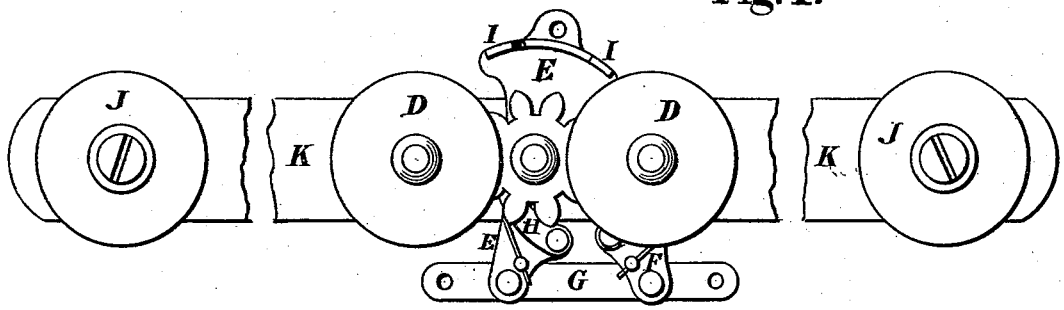
Figure 2:
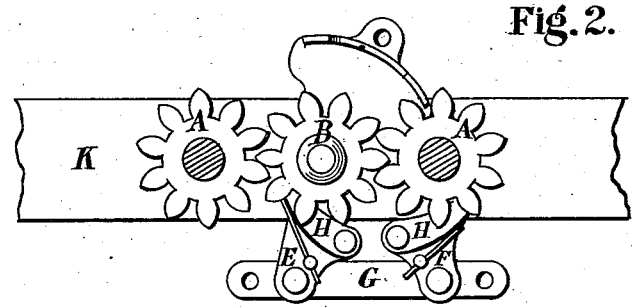
Figure 3:
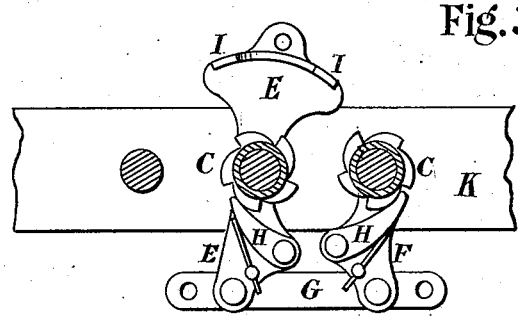

Figure 1 is a top-plan view of the mechanism; Fig. 2, a top-plan view of the same with the pulleys removed; and Fig. 3 is a like view with the gear-wheels and pulleys removed.

Similar letters of reference denote the same parts in the several figures of the drawings.

My invention is designed to convert vibratory or reciprocating motion into intermittent rotary motion; and to this end it consists in two or more gear-wheels meshing into each other, and combined with ratchet-wheels and pawls so arranged that when the pawls are operated by suitable means the gear-wheels shall rotate intermittently in the same or a different direction.

It also consists in the means for transmitting the intermittent motion of the gear-wheels to other mechanism.

In the accompanying drawings, A A represent gear-wheels, upon suitable studs, and meshing into an intermediate pinion, B, also mounted upon a stud. The studs of the pinion and one gear-wheel are each provided with a ratchet-wheel, C, the ratchet-teeth being reversed as respects the two wheels, and the stud of each gear at the upper end carries a grooved or other pulley, D.

Inasmuch as it is the principal object to produce positive rotation of the gear-wheels intermittingly through the medium of the ratchet-wheels, it is evident that the power may be communicated to them in many different ways. As shown in the drawings, two arms, E F, are employed, one oscillating upon the stud of the pinion and one upon the stud of either gear-wheel, but both pivoted together at their outer ends by a connecting-bar, G, to which power may be applied in any convenient manner for oscillating the arms. The two arms carry spring-pawls H H, to engage the ratchet-wheels for the purpose of moving them alternately the distance of one tooth at each throw of the arms, and thereby rotate one gear-wheel by direct action and the other through the medium of the pinion B. The gear wheels are thus rotated intermittingly, but both in the same direction, by reason of the interposed pinion.

In order to stop the rotation of both gear-wheels at exactly the right moment, which is necessary for many purposes, the arm E is extended on the opposite side of the pinion-stud from the connecting-bar G, and provided with stops I I at its outer corners, which are alternately thrown between the teeth of the gear-wheels, to assist their movement as well as that of the arms and connecting-bar. Each throw of the connecting-bar and pawl arms or levers moves one or the other of the ratchet-wheels one tooth, and therefore rotates both gears a certain distance, the stops skipping two teeth of each gear-wheel; hence it is necessary that there shall be twice as many teeth in each gear as there are in each ratchet wheel.

If desired, stops may be cast on the upper or under side of the gear-wheels, or otherwise suitably arranged, the essential requisite in this case being that they shall be equal in number to the number of teeth in the ratchet-wheels. The stops lock the gear-wheels firmly and effectually when moved the proper distance, and enable them to be quickly released on the reverse movements of the pawl-arms, which results are very necessary in certain kinds of machinery to which my invention is applicable.

The ratchet-wheels may be placed under or over the gear-wheels, and the stops and operating devices correspondingly arranged, this being a mere matter of convenience or adaptation to the work to be done by the movement.

In the drawings I have shown the bar G, to which power may be applied to reciprocate it so that the reverse pawls shall engage with their respective gear-wheels. The power may, however, if desired, be applied to that end of the pawl-lever arm E carrying the stops.

These several means for rotating the gear-wheels intermittingly serve to illustrate the principle of my invention; but the invention is not confined to any special means, which may be varied indefinitely without departing from the principle.

Motion may be transmitted from the pulleys D on the gear-wheels, by chains, belts, or cords, to pulleys J J, and by adding pulleys to the gear-wheels their intermittent motion may be communicated to as many other pulleys at different points or angles from the gear-wheels, and the direction of the driven pulleys can be reversed by simply crossing the belts.

It is also evident that shafting may be employed for transmitting the motion of the gears instead of belting, and for some purposes two gear-wheels instead of three may be arranged to be operated by the pawl-arms and ratchets. In this case the two wheels mesh into each other, and a single vibratory lever is hung between them, and carries two pawls, projecting in opposite directions, to engage the ratchet-wheels which are placed on the studs of the two wheels. Each throw of the lever moves the ratchet-wheels one tooth, and suitable stops are provided to limit or arrest the movement of the parts, as above described.

As a means for driving machinery intermittingly the gear-wheels operated as I have described are simple and economical, as well as effective and certain in their action.

Having thus described my invention, what I claim is—

1. The gear-wheels, combined with the reversed ratchet-wheels, and the vibratory pawls to engage the ratchet-wheels for rotating the gear-wheels intermittingly, substantially as described, for the purpose specified.

2. The stops, combined with the ratchet-wheels, the pawls, and pawl-carrier, substantially as described, for the purpose specified.

3. The combination of stops with the gear-wheels, ratchet-wheels, and pawls to arrest the movement of the wheels and pawls at each throw of the part or parts carrying the pawls, substantially as described, for the purpose specified.

4. The combination of two gear-wheels and an interposed gear-wheel or pinion, two reversed ratchet-wheels, and two reversed pawls arranged on a vibratory or oscillating carrier to engage the ratchet-wheels, substantially as described, for the purpose specified.

5. The gear-wheels operated by the ratchet-wheels, reversed pawls, and pawl-carrier, in combination with one or more pulleys on each gear-wheel for transmitting intermittent rotary motion, substantially as described.

In testimony of which invention I have hereunto set my hand this 4th day of June, A. D. 1880.

LEVI SCOFIELD.

Witnesses:
CHARLES CHRISTMAS,
JNO. R. SUTHERLAND.